G. A. BURNHAM.
ELECTRIC MOTOR.
APPLICATION FILED JAN. 3, 1913. RENEWED OCT. 5, 1918.

1,288,503.

Patented Dec. 24, 1918.
2 SHEETS—SHEET 1.

Witnesses:
H. B. Davis
C. Doyle

Inventor:
George A. Burnham
By Hayes & Harriman
Attys.

G. A. BURNHAM.
ELECTRIC MOTOR.
APPLICATION FILED JAN. 3, 1913. RENEWED OCT. 5, 1918.

1,288,503.

Patented Dec. 24, 1918.
2 SHEETS—SHEET 2.

Witnesses:
H. B. Davis.
L. Doyle

Inventor:
George A. Burnham
by Mayer & Harriman
attys.

UNITED STATES PATENT OFFICE.

GEORGE A. BURNHAM, OF SAUGUS, MASSACHUSETTS, ASSIGNOR TO SEARS B. CONDIT, JR., OF BROOKLINE, MASSACHUSETTS.

ELECTRIC MOTOR.

1,288,503.  Specification of Letters Patent.  Patented Dec. 24, 1918.

Application filed January 3, 1913. Serial No. 739,927. Renewed October 5, 1918. Serial No. 257,063.

*To all whom it may concern:*

Be it known that I, GEORGE A. BURNHAM, a citizen of the United States, residing at Saugus, in the county of Essex and State of Massachusetts, have invented an Improvement in Electric Motors, of which the following is a specification.

This invention relates to electric-motors, and has for its object the construction of an electric-motor which may be employed for connecting a driven-member with a driving-member, and for driving said members when connection is made and permitting disconnection of said members immediately upon cessation of the flow of current, and also for other purposes.

In the embodiment of my invention here shown, for the sake of illustration, movable-means is arranged in the magnetic-field of the motor, which means may be a part of the field-frame of the motor, and which is movable by the attractive force of the field when a current traverses the field-coils. The invention also embodies a driven-member arranged to be moved into coöperative relation with a driving-member by said movable-means, and a driving-member which is connected with the shaft of the motor so as to be operated by the motor to drive the driven-member when said members are in engagement, yet when the flow of current ceases the movable-means controlling the driven-member immediately returns to its normal retracted position, disconnecting the driven-member from the driving-member.

The invention also embodies means controlled by said electro-magnetic movable-means to in turn control the starting of the motor, and in carrying out this feature of the invention a brake may be arranged on the armature of the motor to restrain its rotation, which is adapted to be operated by said movable-means to release the armature or a switch for the circuit of the armature may be provided which is controlled by said movable-means. The invention also has for its object the provision of means arranged on or in connection with said movable-means to prevent the same from chattering when an alternating current is caused to traverse the exciting-coils of the motor.

Figure 1:
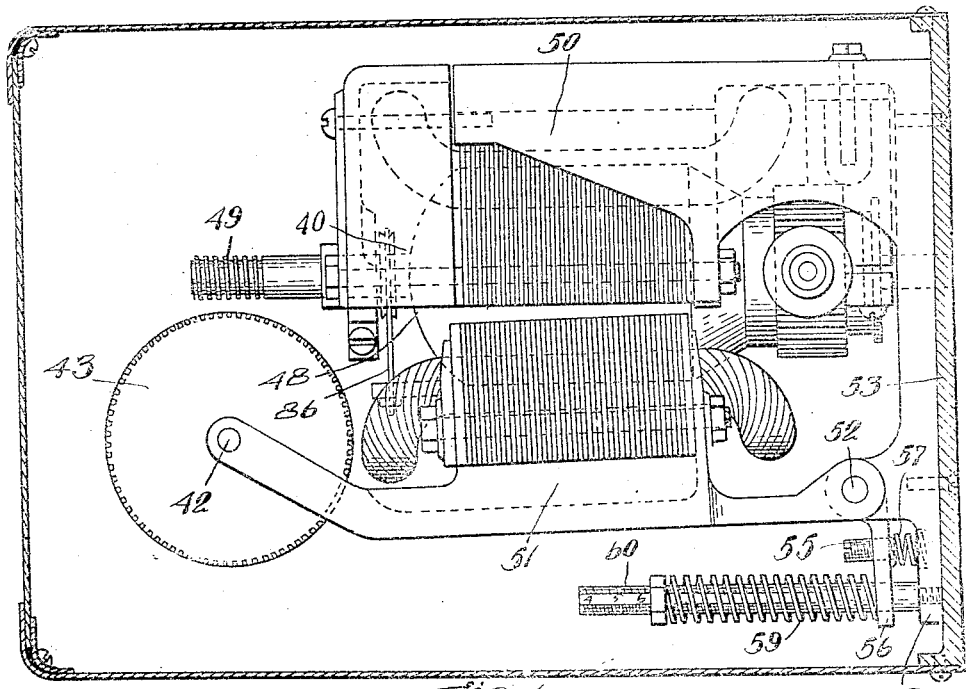
Figure 1 is a side elevation of an electric-motor embodying this invention.
Figure 3:
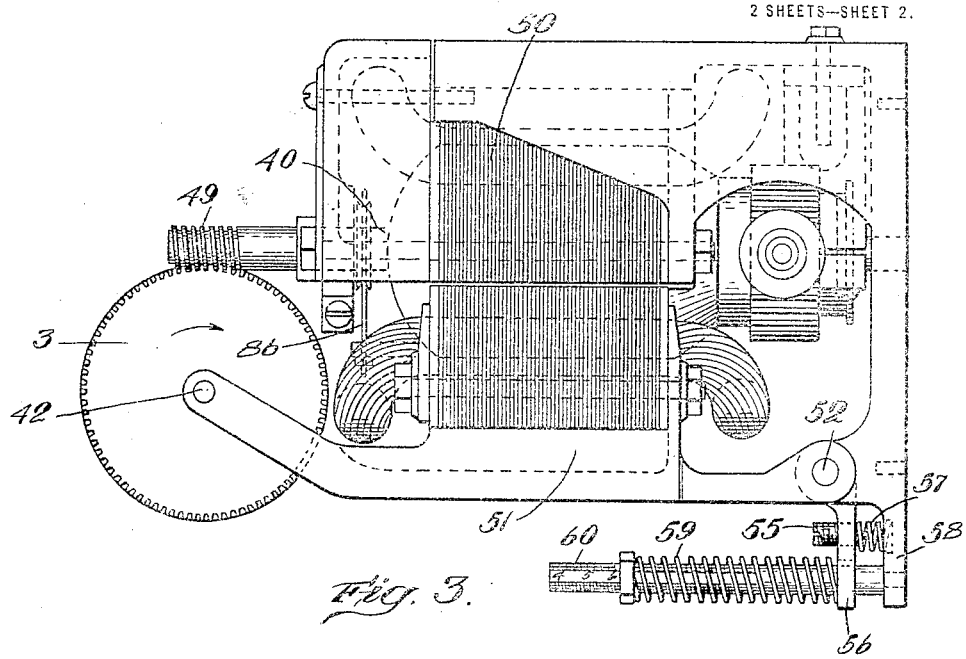
Fig. 3 is a detail illustrating the driven-member in engagement with the driving-member.

The electric-motor here shown for illustrating my invention is of the rotary repulsion type. 40 represents the rotary armature of the motor which is supported in suitable bearings. The field-frame of the motor is or may be made in two parts, divided on a horizontal line or otherwise, 50 representing the upper part and 51 the lower part, and said parts are hingedly connected together at 52, so that the lower part is movable toward and from the upper part, while the upper part is held stationarily, being connected with a supporting-frame 53. Other than making the field-frame with a movable part or element, it will be constructed, generally speaking, in any usual or suitable manner to support the field-coils. Movement of the lower part 51 in a direction away from the upper part is limited by an adjustable yielding stop comprising, as here shown, a pin 55, extended through an ear 56, arranged thereon, which engages a spring 57 resting against a fixed abutment 58 which may be a downward extension of the upper part of the frame. Movement of said lower part 51 in a direction toward the stationary part 50 is controlled by a spring 59 arranged on a fixed pin 60 and bearing at one end against a nut on said pin and at the other end against an ear 56. Said lower part 51 of the field-frame, being in the magnetic-field of the motor, will be moved by the attractive influence of said field. Said movable-part 51 of the field-frame serves as and constitutes movable-means arranged in the magnetic-field of the motor, and which is moved by the attractive influence of said field, but my invention includes any other form of movable-means arranged in the magnetic-field of the motor and which is movable by the attractive influence of said field, whether it is or is not a part of the field-frame of the motor. The movable-means may be employed for the accomplishment of several different results and, as here shown, one of the results which it is designed to accomplish is to connect a driven-member with a driving-member and subsequently operate both members. As here shown, one end of the motor-shaft is threaded as at 49, to form a worm which constitutes the driving-member, and a worm-wheel 43 may be employed as the driven-member, which latter is secured to a shaft 42, borne by the movable-part 51 and arranged beneath the worm so that it is movable into and out of engagement with the worm upon corresponding movements of the movable-means bearing it. When said members are in engagement, as shown in Fig. 3, they will be rotated by the motor. The driven-member may be employed to drive any suitable means or mechanism which may be engaged by it, or connected with it, yet said driven-member, it will be observed, is at all times free to become disengaged from the driving-member immediately upon cessation of the flow of current, as shown in Fig. 1. Thus it will be seen that the engagement of the driven-member with the driving-member and the subsequent rotation of both members is controlled by the current.

Figure 2:
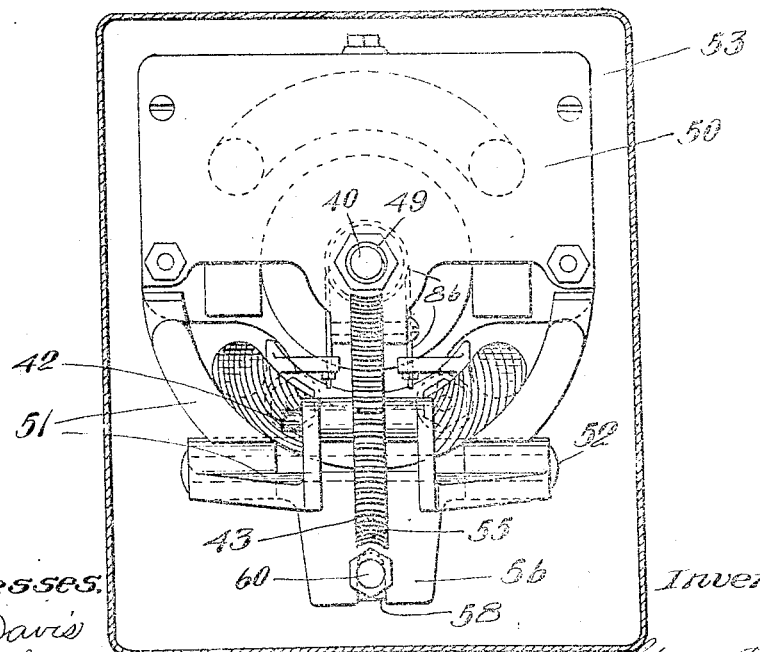
Fig. 2 is an end elevation of the same.

Said movable means or part 51 may be employed to control the starting of the motor by controlling the armature thereof, and, as shown in Figs. 1 to 3, a brake 86 is arranged on the armature-shaft which is connected with the movable-part 51, and when said part 51 is in its normal or retracted position said brake will be applied and will hold said armature-shaft against rotation, but when said part 51 is moved toward the part 50 said brake will be operated to release the armature shaft, permitting said shaft to rotate.

Figure 4:
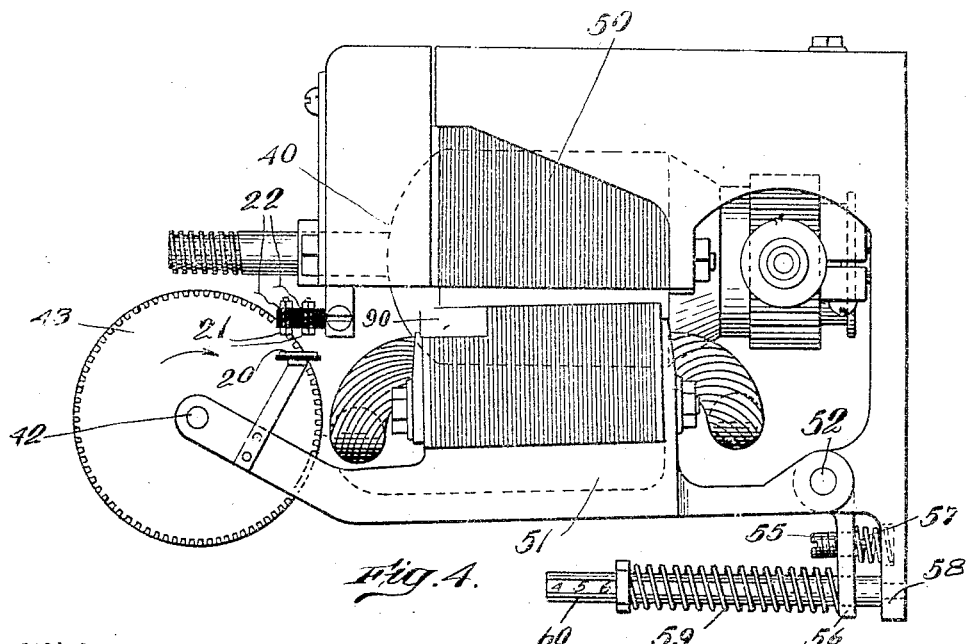
Fig. 4 is a side elevation of a portion of the electric-motor shown in Fig. 1, illustrating a modified means for controlling the starting of the motor.

In Fig. 4 modified means are shown for accomplishing this result, said means consisting of a switch-member 20, arranged on the movable-part 51, adapted to engage the switch-members 21, which are connected with a circuit 22 of the armature-winding of the motor, and when said movable-part 51 is moved said circuit will be closed by the switch and the motor started. Hence I desire to include within the scope of this feature of my invention any equivalent means for starting the motor, which is arranged to be controlled by the movable-means arranged in the magnetic-field of the motor and adapted to be moved by the attractive influence of said field.

When the field-frame has a movable part, as 51, and an alternating current is caused to traverse the exciting-coils of the motor, said part is liable to chatter, and to obviate chattering I have arranged on one or both poles of said part 51 an endless band or ring of copper or other conducting material, shown at 90, which surrounds a portion of the end thereof. This conducting band or ring forms an isolated closed circuit which is so arranged in the magnetic-circuit that a current of a phase relation different from that in the field-coils may traverse the closed circuit and cause said part 51 to remain in attracted position. It will be understood that all of the features here shown may or may not be employed according to the work which it is intended the motor shall perform.

I claim:—

1. An electric-motor having a part of its field-frame movable with respect to the remaining portion thereof and adapted to be moved by the magnetic influence of the field, a switch controlling the circuit of the exciting-coils of the armature of the motor, arranged for operation by said movable part of the field-frame when in attracted position, thereby to control the starting of the armature, substantially as described.

2. An electric-motor having a part of its field-frame movable with respect to the remaining portion thereof, and adapted to be moved by the magnetic influence of the field, a switch controlling the circuit of the exciting-coils of the armature of the motor arranged for operation by said movable part of the field-frame when in attracted position, thereby to control the starting of the armature, and means to regulate the attractive movement of said movable part, substantially as described.

3. An electric-motor having a part of its field-frame movable with respect to the remaining portion thereof, and adapted to be moved by the magnetic influence of the field, and means controlling the starting of the armature of the motor operated by said movable part of the field-frame, substantially as described.

4. An electric motor having a part of its field frame made movable with respect to the remaining portion thereof by the magnetic influence of the field, means controlling the starting of the armature of the motor adapted for operation by said movable part of the field, a driving-member and a driven-member, normally disengaged, and adapted to be engaged by said movable part of the field frame, whereby the motor is started and the driving and driven-members engaged at substantially the same time.

5. An electric motor having a part of its field frame made movable with respect to the remaining portions thereof, by the magnetic influence of the field, a driving-member connected with the motor shaft, a driven-motor shaft movable into and out of engagement with the driving-member by said movable part of the field frame, an electric circuit for the armature inductively related to the field coils, a switch for said circuit to control the starting of the armature, the movable-member of which is adapted for operation by said movable part of the field frame, whereby the motor is started and the driven-member moved into engagement with the driving-member at substantially the same time.

In testimony whereof, I have signed my name to this specification, in the presence of two subscribing witnesses.

GEORGE A. BURNHAM.

Witnesses:
D. M. SHIFFERT,
E. C. WATERHOUSE.